United States Patent [19]

Teulings

[11] Patent Number: 4,524,361
[45] Date of Patent: Jun. 18, 1985

[54] RADAR SYSTEMS EMPLOYING TWO KINDS OF PULSES

[75] Inventor: Wilhelmus A. Teulings, Haaksbergen, Netherlands

[73] Assignee: Hollandse Signaalapparaten B.V., Hengelo, Netherlands

[21] Appl. No.: 372,884

[22] Filed: Apr. 29, 1982

[30] Foreign Application Priority Data

May 5, 1981 [GB] United Kingdom ................. 8113690

[51] Int. Cl.³ ............................................. G01S 13/28
[52] U.S. Cl. ............................................. 343/17.2 PC
[58] Field of Search ................. 343/17.2 PC, 17.1 PW

[56] References Cited

U.S. PATENT DOCUMENTS

| | | | |
|---|---|---|---|
| 3,225,349 | 12/1965 | Thor | 343/7.7 |
| 3,945,011 | 3/1976 | Glasgow | 343/17.2 PC |
| 3,979,748 | 9/1976 | Gelleknik | 343/17.2 PC X |
| 4,053,884 | 10/1977 | Cantrell et al. | 343/17.2 PC X |
| 4,136,341 | 1/1979 | Mulder et al. | 343/17.2 PC |

OTHER PUBLICATIONS

M. I. Skolnik, "Introduction to Radar Systems", 1962, pp. 493–500, McGraw-Hill Book Co.

J. M. Colin et al., "Pulse Compression in Radars using Binary Phase Modulation", Electrical Communication, vol. 52, No. 2, 1977, pp. 152–157.

*Primary Examiner*—T. H. Tubbesing
*Assistant Examiner*—Gilberto Barrón, Jr.
*Attorney, Agent, or Firm*—Robert J. Kraus

[57] ABSTRACT

In a radar system frequency-modulated transmitter pulses of relatively long duration and frequency-modulated transmitter pulses of relatively short duration are generated and transmitted through a common transmitter channel, both channels containing a pulse compression filter, for the detection of return signals from the transmitter pulses of relatively long duration and of relatively short duration respectively.

2 Claims, 1 Drawing Figure

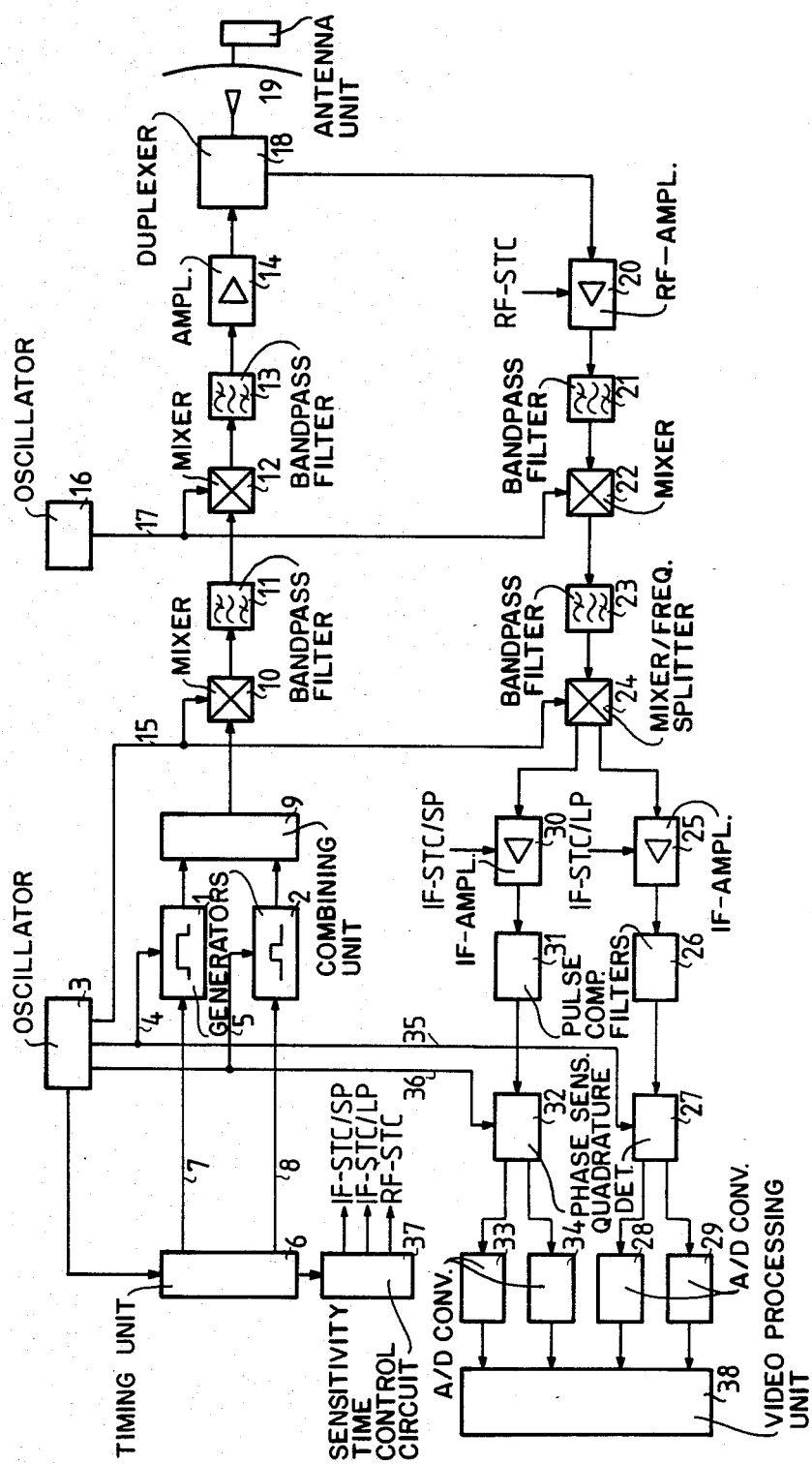

RADAR SYSTEMS EMPLOYING TWO KINDS OF PULSES

The invention relates to a radar system comprising a first generator for generating frequency-modulated transmitter pulses of relatively long duration; a second generator for generating transmitter pulses of relatively short duration; a transmitter channel, coupled to said first and second generators, through which channel both the long and the short-duration transmitter pulses are transmitted; and a receiver having a first receiving chanel, containing a pulse compression filter for the detection of return signals from the transmitter pulses of relatively long duration, and a second receiving channel for the detection of return signals from the transmitter pulses of relatively short duration.

Such a radar system will be referred to as a radar system of the kind defined. One radar system of this kind is described in U.S. Pat. No. 4,136,341. In the system described in the cited patent the frequency-modulated transmitter pulses of relatively long duration provide signals indicative of distant targets; the unmodulated transmitter pulses of relatively short duration provide signals indicative of nearby targets. The length of the transmitter pulses of relatively short duration must be sufficiently short to assure a good range-resolution and to allow the radar to operate with a short minimum range. As a consequence, the transmitted energy and thus the range covered by the transmitter pulses of relatively short duration will be limited. In practice the range covered by the transmitter pulses of relatively short duration may be smaller than the range within which strong clutter and, with the application of the radar system in air traffic control, a relatively high density of air traffic will appear. The last part of the latter range will then be covered by the frequency-modulated transmitter pulses of relatively long duration. This, however, makes it possible that, if there is a coincidence of signals from strong clutter and desired targets, the receiver will suffer from desensitisation and the desired targets can be weakened or masked. This desensitisation will occur more frequently when the strong clutter is more frequent and when the transmitted pulse length is larger. This invention seeks to provide a radar system in which this disadvantage is mitigated.

According to the invention there is provided a radar system of the kind defined in which the second generator comprises means for frequency-modulating the transmitter pulses of relatively short duration and the second receiving channel includes a pulse compression filter for compressing the return signals of the transmitter pulses of relatively short duration. By the measures according to the invention the transmitted pulses of relatively short duration have sufficient energy to cover the region in which strong clutter and a relatively high density of air traffic may appear; on the other hand, the pulse length may be made sufficiently short that the described disadvantage is mitigated, the minimum range is still acceptable, but the range-resolution is increased due to the use of pulse compression.

The invention and its practice will now be described in more detail with reference to the accompanying drawing, which illustrates a block diagram of an embodiment of a radar system according to the invention.

The radar system shown in the drawing comprises a first generator 1 for generating frequency-modulated transmitter pulses of relatively long duration and a second generator 2 for generating frequency-modulated transmitter pulses of relatively short duration, having the same or a greater pulse repetition frequency than the transmitter pulses of relatively long duration. The radar system further comprises an oscillator 3, determining the frequencies of the two kinds of transmitter pulses via lines 4 and 5, and a timing unit 6 controlled by oscillator 3; this timing unit determines the pulse repetition frequency of the transmitter pulses via lines 7 and 8. As described in the U.S. Pat. No. 4,136,341 the pulse repetition frequency of the second generator will preferably be greater than that of the first generator. The transmitter pulses produced by the two generators are combined by a unit 9 in a common transmitter channel, in which the frequencies of the two kinds of transmitter pulses are stepwise transformed into the desired transmitter frequencies. The transmitter channel includes a first mixer 10, a first bandpass filter 11, a second mixer 12, a second bandpass filter 13 and an r.f. amplifier 14. In mixer 10 the two kinds of transmitter pulses are mixed with a signal supplied via line 15. Bandpass filter 11 transmits only the desired side frequencies of the output signals from mixer 10. In mixer 12 the signals passed through filter 11 are mixed with a signal of oscillator 16 supplied via line 17. Similarly bandpass filter 13 transmits only the desired frequencies.

If, for example, generator 1 produces pulses with a swept frequency-modulation of 29.5–32.5 MHz and generator 2 pulses with a swept frequency-modulation of 45–48 MHz, while the oscillator 3 supplies via line 15 a signal with a frequency of 248 MHz, a bandwidth of filter 11 of 273–297 MHz is sufficient to pass both kinds of pulses. If the oscillator 16 supplies via line 17 a signal with a frequency in the interval 1530–1630 MHz, the bandwidth of filter 13 must be about 1200–1400 MHz.

Both kinds of transmitter pulses are transmitted via the r.f. amplifier 14, a duplexer 18 and an antenna unit 19. The duplexer 18 comprises a ferrite circulator to separate the transmitter and receiver and a receiver protector consisting of a TR-tube.

The return signals received by the antenna unit 19 are supplied to a receiver via the duplexer 18. The receiver includes a first and a second receiving channel, both channels having a common part comprising an r.f. amplifier 20, a first bandpass filter 21, a mixer 22, a second bandpass filter 23 and a mixer/frequency splitter 24. In this common part of both receiving channels the frequencies of the return signals of the two kinds of transmitter pulses are amplified and stepwise transformed into signals of the desired intermediate frequency. In the embodiment here described the r.f. amplifier 20 is of the "low noise transistor amplifier" (LNTA) type. After filtering in bandpass filter 21, the amplified r.f. signals are applied to the mixer 22 and mixed with a signal supplied by oscillator 16 via line 17. The bandpass filter 23 again transmits the desired frequencies. The function of the bandpass filter 21 is to keep the noise generated in the—wide band—LNTA outside the considerably narrower band of mixer 22. In mixer/frequency splitter 24 these frequencies are subsequently transformed to an intermediate frequency level through the application of a signal supplied by oscillator 3 via line 15. In the example, in the mixer 24 return signals of the long and the short duration transmitter pulses are obtained with center frequencies of 31 and 46.5 MHz respectively. These signals can easily be frequency separated and processed in separate receiving channel parts.

The frequency-modulated return signals of relatively long duration are processed in the first receiving channel. Apart from the common part, the first receiving channel contains an i.f. amplifier 25, a pulse compression filter 26, a phase-sensitive quadrature detector 27 and analog-to-digital converters 28 and 29. The frequency-modulated return signals of relatively short duration are processed in the second receiving channel. Apart from the common part, the second receiving channel contains an i.f. amplifier 30, a pulse compression filter 31, a phase-sensitive quadrature detector 32 and analog-to-digital converters 33 and 34. The return signals from mixer/frequency splitter 24 are consequently amplified, compressed, phase-detected in orthogonal I and Q components by means of a signal supplied by oscillator 3 via lines 35 and 36 respectively, and digitized. For further processing the digitized I and Q components of both receiver channels are supplied to a video processing unit 38.

As already mentioned, the frequency-modulated transmitter pulses of relatively short duration must have a short pulse length such that the minimum range is acceptable, a good range-resolution is obtained and the disadvantage of receiver desensitisation and weakening or masking of the desired targets in the event of a coincidence of signals from strong clutter and desired targets is mitigated. If, for example, the applied frequency-modulated pulses of relatively short duration have a pulse length of 3 $\mu$sec and a compression ratio of 6 is applied in the receiver, the range-resolution will be about 75 m and the minimum range about 450 m. The first return signals at minimum range will have stronger time side lobes because of the recovery time of the TR-tube in the duplexer 18. This could be avoided by using a solid state RF switch as duplexer.

By replacing the unmodulated transmitter pulses of relatively short duration in the radar system, described in the U.S. Pat. No. 4,136,341, by frequency-modulated transmitter pulses of short duration, an increased sensitivity of the receiver can be obtained. If, for example, the unmodulated transmitter pulses haave a pulse length of 1 $\mu$sec and the frequency-modulated transmitter pulses a pulse length of 3 $\mu$sec with a compression ratio of 6 in the receiver, the sensitivity increases by 6 to 8 dB. This means that, with the same signal-to-noise ratio, the dynamic range of the receiver is increased by 6 to 8 dB.

The radar system according to the invention further comprises a sensitivity time control (STC) circuit 37, which provides the control signals RF-STC, IF-STC/LP and IF-STC/SP for the amplifiers 20, 25 and 30 respectively. The radio frequency STC for the amplifier 20 suppresses the gain of this amplifier to prevent saturation and non-linearities caused by strong nearby clutter. The above-mentioned increase of 6 to 8 dB of the receiver sensitivity may be used to increase the amount of RF-STC applied to the amplifier 20, while maintaining the 1 dB compression point of the intermediate frequency amplifiers. The intermediate frequency STC for amplifiers 25 and 30 suppresses the gain of these amplifiers to prevent saturation and non-linearities caused by point clutter.

If desired, the video signals in the first receiving channel can be gated out in the video processing unit 38 at least for the time the intermediate frequency amplification in the first receiving channel is suppressed by the sensitivity time control circuit 37.

I claim:

1. In a radar system comprising a first generator for generating frequency-modulated transmitter pulses of relatively long duration; a second generator for generating transmitter pulses of relatively short duration; a transmitter channel coupled to said first and second generators for transmitting both the long and the short-duration transmitter pulses; and a receiver having a first receiving channel containing a pulse compression filter for the detection of return signals from the transmitter pulses of relatively long duration, and a second receiving channel for the detection of return signals from the transmitter pulses of relatively short duration the improvement wherein the second generator comprises means for frequency-modulating the transmitter pulses of relatively short duration and the second receiving channel includes a pulse compression filter for compressing the return signals of the transmitter pulses of relatively short duration.

2. The radar system of claim 1, wherein the first and the second receiving channels comprise a common channel part for receiving the return signals from both the pulses of relatively long duration and relatively short duration and transforming these received return signals to an intermediate frequency region, and separate receiving channel parts for frequency separation and further processing of the return signals from the long and the short duration transmitter pulses after the frequency of said return signals has been transformed to the intermediate frequency region.

* * * * *